United States Patent Office 3,343,913
Patented Sept. 26, 1967

3,343,913
PROCESS FOR PRODUCING SYNTHETIC FAUJA-SITE HAVING A HIGH SILICA TO ALUMINA RATIO
Harry Edwin Robson, Baton Rouge, La., assignor to Esso Research and Engineering Company, a corporation of Delaware
No Drawing. Filed Dec. 31, 1963, Ser. No. 334,911
8 Claims. (Cl. 23—113)

This application is a continuation-in-part of copending application U.S. Ser. No. 227,729, filed Oct. 2, 1962, in the name of Harry Edwin Robson, now abandoned.

The present invention relates to a process for the manufacture of synthetic zeolites. It particularly relates to an improved process for making compositions of sodium-form synthetic faujasite. Specifically, it relates to a process of making large pore, highly crystalline sodium-form synthetic faujasite compositions having high silica to alumina ratios from reaction mixtures having relatively low silica to alumina ratios and low water contents.

More specifically it relates to a process of making improved crystalline sodium synthetic faujasite adsorbents from reaction mixtures of low silica to alumina ratios having low water contents and thus relatively high soda contents.

As employed in the present specification, the term "large pore zeolites" refers to metallic alumina silicate zeolites characterized by their highly ordered crystalline structure and having pores of nearly uniform dimensions in the range of about 6 to 15 A. One type of large pore zeolite has been generally referred to as "Type X" zeolite as described in U.S. Patent No. 2,882,244. Another widely known type of zeolite is "Type A" zeolite as described in U.S. Patent No. 2,882,243. The "Type A" zeolites have pore sizes in the range of 3 to 5 A. The "Type A" and "Type X" zeolites differ in their crystalline structures. These two basic types of zeolites can be readily identified by standard X-ray diffraction and product analysis techniques. The type of zeolite that this application deals with is the synthetic faujasite variety, one example of which has been termed a "Type Y" zeolite in Canadian Patent No. 639,645. A natural example of this zeolite is the mineral faujasite. The chemical formula of the synthetically produced anhydrous, large pore, faujasite type zeolite expressed in terms of moles may be represented as follows:

$$1.0 \pm 0.2 Na_2O : Al_2O_3 : n SiO_2$$

wherein $n$ has a value above about 3, e.g. from 3 to 7. The "X" and "Y" zeolites and natural faujasite have identical structure types and differ only in the ratio of silica to alumina in the final crystalline structure. For example, zeolite "X" is generally referred to as having a silica to alumina ratio of 2 to 3, whereas zeolite "Y" is generally referred to as having a silica to alumina ratio of 3 to 7.

The synthetic faujasites having the higher silica to alumina ratio (i.e. 3 to 7) are much more useful commercially as adsorbents as they have proven to be much more stable at high temperatures in the presence of moisture than those having the lower ratio (i.e. 2 to 3). The stability of synthetic faujasite is attributed to the high silica to alumina ratio and generally stability increases as the ratio of silica to alumina increases in the crystalline structure. The type of zeolite produced in accordance with the present invention is the synthetic faujasite type having the higher ratio above about 3, preferably 3 to 7, more preferably 4 to 6, specifically 4.5 to 5.5.

Heretofore, in order to obtain crystalline synthetic faujasites of high silica to alumina ratio content, it was found necessary to use very high ratios of silica to alumina in the reaction mixture, for example, ratios as high as 8 to 40 of silica to alumina. It was found that where lower ratios of silica to alumina were used in the reaction mixture, other crystalline phases or amorphous materials were obtained.

In making synthetic crystalline alumina silica zeolites, four ingredients are required in the reaction mixture and the molar proportions of these ingredients to each other largely determine which type of zeolite is produced and whether other extraneous crystalline materials are produced. It is known to produce synthetic faujasites (Types "X" and "Y" zeolites) by mixing the below-listed constituents in the below-listed proportions in the reaction mixture.

TABLE I

| Reactants, Mole Ratio | 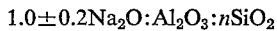 SiO$_2$/Al$_2$O$_3$ in Product | |
|---|---|---|
| | 2-3 | 3-7 |
| Na$_2$O/SiO$_2$ | 0.7-1.0 | 0.28-0.45 |
| SiO$_2$/Al$_2$O$_3$ | 2.5-5.0 | 8-30 |
| H$_2$O/Na$_2$O | 20-60 | 20-60 |

In making the high silica to alumina synthetic faujasites, it was found that where low ratios of soda to silica in the reaction mixture have previously been used, the minimum ratio of silica to alumina was 8 to 30. Where ratios of silica to alumina below 8 were used, other extraneous type crystalline materials or amorphous materials resulted. Even in the situation where the high silica to alumina synthetic faujasites were made utilizing silica to alumina ratios of, for example, 8 to 10, it was found necessary to carry out the crystallization in two steps, namely, a prolonged digestion step at ambient temperature and a prolonged crystallization step at elevated temperatures.

Further, where high silica to alumina ratios, for example, of 10 to 40, were used in making the high silica to alumina faujasites, it was found difficult to obtain reproducible results. Also, in those reaction mixtures the percentage of silica in the reaction mixture that went into the crystallized product was low, i.e., there was a low utilization of silica in the reaction mixture in forming the product. Still further, the prior art reactions were generally carried out in the presence of large amounts of water which applicant found reduced or slowed the rate of crystallization of the zeolite product. Slow crystallization, low utilization of SiO$_2$ and not obtaining reproducible results tended to make the prior art processes uneconomical and commercially unattractive. Where silica to alumina ratios of 8 to 10 were used to make the high silica to alumina type of synthetic faujasite, it required prolonged crystallization time and the additional digestion step. Normally, the digestion step required 20–40 hours and the second crystallization step at high temperatures required 20–80 hours. Applicant completely unexpectedly found that high quality zeolite could be produced in accordance with his process.

In referring to applicant's improved process, the crystallinity of the zeolite product will be used as an indication of product quality and will be defined as follows.

The crystallinity is defined as the sum of the intensities of the ten strongest lines of the X-ray diffraction pattern divided by a constant, 1.72. The ten strongest lines in the X-ray diffraction pattern for a laboratory standard sample of sodium form of synthetic faujasite are given below. The intensities refer to observed amplitudes (peak minus background) on an X-ray spectrometer trace for the laboratory-standard sample.

| K.k.l. | D (A.) | Intensity |
|---|---|---|
| 111 | 14.27 | 88.4 |
| 220 | 8.740 | 13.0 |
| 311 | 7.453 | 9.5 |
| 331 | 5.671 | 20.0 |
| 333 | 4.757 | 10.0 |
| 440 | 4.370 | 12.5 |
| 533 | 3.770 | 19.4 |
| 642 | 3.303 | 10.1 |
| 555 | 2.854 | 10.1 |
| 664 | 2.635 | 5.0 |
| Total | | 198.0 |

The laboratory standard, a well crystallized synthetic faujasite free of extraneous phases, has a crystallinity of 115. The X-ray diffraction traces for the examples described below were recorded under instrument conditions identical to the above standard sample. The observed intensities for these same ten diffraction lines were determined and the sum divided by a constant, 1.72, to give calculated crystallinity.

The efficiency of the reaction mixture in forming synthetic faujasite is determined by the utilization of silica. $SiO_2$ utilization is here defined as that fraction of the total $SiO_2$ in the reaction mixture which is incorporated into the zeolite product. It is calculated from the known composition of the reaction mixture, the weight percent zeolite product, and product analysis by wet chemical techniques. It is further corroborated by a silica material balance over the crystallization process assuming 100% incorporation of $Al_2O_3$ into the product and $$Na_2O/Al_2O_3 = 1$$

in the product.

It is an object of the present invention to make synthetic crystalline sodium faujasite having a high silica to alumina ratio above about 3, preferably 3 to 7, more preferably 4 to 6, and specifically 4.5 to 5.5, from reaction mixtures which have relatively low silica to alumina ratios, low soda to silica content, and low water concentrations. It is a further object of the present invention to carry out the process in such a manner that the maximum utilization of silica in the reaction mixture is obtained in forming the high silica to alumina crystalline product. It is a still further object of the invention to increase the rate of crystallization and the crystallinity of the product.

In accordance with applicant's invention, it was unexpectedly found that by decreasing the relative amount of soda in the reaction mixture and the water content the high silica type crystalline synthetic sodium faujasite could successfully be made with lower silica to alumina ratios in the reaction mixture. By following the teachings of the present invention, the faujasite can be made in good yield and of high quality employing reaction mixtures comprising soda to silica ratios of 0.28 to 0.55, e.g. 0.3 to 0.50, and silica to alumina ratios of 4 to less than 8 in a one-step crystallization process with the water to soda ratios of 15 to 40, e.g. 20 to 40, with minimum crystallization time.

Applicant has found that the synthetic faujasite products may be produced having silica to alumina ratios of 3 to 7 from reaction mixtures having low silica to alumina ratios by carefully controlling the soda to silica ratio in the reaction mixture, the water to soda ratio, and the crystallization time. Under the conditions utilized by applicant, it is completely unexpected to find that the higher silica to alumina ratio type of synthetic faujasite could be produced from applicant's reaction mixtures. It would normally be expected to find that other crystalline phases or amorphous material would be produced.

In accordance with the present invention, applicant's large pore crystalline zeolites are prepared by having present in the reaction mixture alumina as sodium aluminate, alumina gel, alumina sol and the like, silica as sodium silicate and/or silica gel and/or silica sol, the silica sol being preferred, and sodium hydroxide either free or in combination with one of the above components. The ratio of silica to alumina in the reaction mixture is kept low as is the ratio of water to soda. In carrying out the synthesis, it is necessary to maintain careful control of the crystallization time. The synthesis process requires a thorough mixing of the reactants under conditions designed to remove the heats of reaction and mixing as will be hereinafter described, and then heating the reaction mixture to elevated temperature and holding at said temperature for a sufficient time to form the crystalline zeolite product. The crystalline product is then separated from the reaction mixture, washed, and heated to a high temperature to obtain the anhydrous crystalline product. The crystallization time is critical in that if too short a crystallization time is used, an insufficient amount of the reaction mixture is converted to product, and if too long a period is used extraneous crystalline products other than the desired zeolite are formed. For example, a crystallization time of 5 to 50 hours has proven to be effective.

Several process advantages and improvements result in carrying out the process in accordance with applicant's invention. It was unexpectedly found that by reducing the ratio of silica to alumina in the reaction mixture, the rate of crystallization of the product and the silica utilization was increased. Reducing the water content of the reaction mixture also improves product crystallinity as well as rate of crystallization. It is further found that crystalline products of high quality and good yield can be obtained from reaction mixtures in relatively short crystallization periods.

There are four principal reactants present in the reaction mixture: they are soda ($Na_2O$), silica ($SiO_2$), alumina ($Al_2O_3$), and water ($H_2O$). These ingredients are added from source materials which may contain one or more of the reactants in amounts sufficient to obtain the proportions of each of these constituents to the others as recited below. Soda may be added as either sodium silicate, sodium aluminate, or sodium hydroxide. The silica can be added as sodium silicate or as an aqueous sol of colloidal silica, or as silica gel, the silica sol being preferred. The alumina may be added as sodium aluminate, alumina hydrate, or as an aqueous alumina sol, the alumina hydrate being preferred. The water is added separately or as a component of one of the other constituents. Depending on the source of the reactants, the proportions of other reactants are adjusted so that the ratios of the reactants and their relative proportions to each other are as indicated below.

The proportions of each of the reactant materials in the reaction mixtures are critical and determine to a large degree the crystallinity of the product, the yield, and the ratio of silica to alumina obtained in the crystalline product.

In accordance with the present invention, synthetic faujasites having silica to alumina ratios above 3, preferably 3 to 7, more preferably 4 to 6 and specifically 4.5 to 5.5, may be produced. To produce zeolites of this type, the molar ratios of the reactants should fall within the ranges shown in Table II, which are set forth in order of increasing preference, i.e. Range IV being the most specific and most preferred. The amount of water present in the reaction mixture is critical as it determines to a certain extent the rate of crystallization, whether or not a crystalline product will be obtained, and to a certain extent the crystallinity of the product obtained.

TABLE II

|  | I | II | III | IV |
|---|---|---|---|---|
| $SiO_2/Al_2O_3$ | 4 to less than 8 | 4 to less than 8 | 5 to 7.5 | 6 to 7. |
| $Na_2O/SiO_2$ | .28 to .55 | .30 to .50 | .30 to .40 | .30 to .35. |
| $H_2O/Na_2O$ | 15 to 40 | 20 to 40 | 20 to 30 | 20 to 25. |

As a specific example, a synthetic faujasite having a silica to alumina ratio of 4.5 to 5.5 is prepared from a reaction mixture having a silica to alumina ratio of about 7.0, a soda to silica ratio of about 0.30 and a water to soda ratio of about 23.

The temperature at which the crystallization is effected and the period of crystallization are critical and interrelated. In accordance with the present invention, crystallization temperatures of 80–120° C., and preferably of 90–110° C., are used. The period of crystallization at these temperatures is critical in that if too short a time is used, an insufficient amount of the desired faujasite phase is obtained whereas if too long a time is used, extraneous crystalline materials appear in the reaction mixture, that is, crystalline materials other than the desired high silica to alumina synthetic faujasite. The reaction can be carried out effectively for crystallization periods of 5–50 hours and preferably at crystallization periods of 16–36 hours. Crystallization is carried out at elevated temperatures for a time sufficient to obtain the maximum amount of zeolite crystals.

The crystals are then separated from the mother liquor and washed and will normally contain up to 10 moles of water of hydration. The crystals thus obtained can be activated by heating to temperatures of 300–450° C. which removes the water of hydration and produces crystals which are substantially anhydrous. This leaves a crystalline structure interlaced with canals of molecular dimensions, which crystalline material can be used as an absorbent.

In accordance with a preferred procedure of the present invention, sufficient amounts of sodium aluminate, sodium hydroxide, and an aqueous sol of colloidal silica are admixed in the presence of added water to form a homogeneous mixture, wherein the molar ratios of the constituents are within the ranges hereinbefore set forth. Preferably, a stream of sodium aluminate liquor containing soda and alumina and prepared by a procedure hereinafter to be described, is added to a concentrated silica sol containing 30 to 50 wt. percent, preferably 35 to 42 wt. percent, $SiO_2$, which is also prepared by a procedure to be hereinafter described. These two liquids are combined in either a batchwise operation or a continuous mixing operation in suitable proportions using suitable mixing devices. Gelation usually occurs almost instantaneously upon mixing with a resultant liberation of the heat of reaction and heat of mixing which may cause the gel temperature to rise as high as about 150° F. It has been found that for optimum production of synthetic faujasite containing a minimum amount of extraneous zeolite phases, this liberated heat should preferably be removed prior to the crystallization of the zeolite. Thus, in a particularly preferred procedure the reaction mixture is cooled below about 100° F., and preferably below about 80° F., until the reactants have been combined and thoroughly reacted. This may be accomplished by either cooling the two liquid streams prior to their combination to temperatures designed to result in a final mixture temperature below this value, or by cooling the reaction mixture while the two streams are being combined or after formation of the gel. To produce a very highly crystalline product, it has been found still more preferable to cool the reaction mixture without freezing (i.e. without forming ice crystals) to within a few degrees of but not below its freezing point, e.g. about 33° to 40° F., prior to the heat-up to crystallization temperature.

Since the reaction mixture formed by the combination of the above ingredients will usually rapidly solidify to a relatively immovable mass (regardless of the temperature to which it is cooled), it will usually be preferred to discharge it into a suitable heat exchange medium, for example, a hydrocarbon oil having a flash point substantially above the temperature of crystallization. Mixing of the resulting suspension of reaction gel in oil will result in a sufficiently fluid mixture for efficient heat transfer. Again, the temperature in this stage should be kept below the above values. This preferred embodiment involving the use of the heat transfer medium is the subject of copending application Ser. No. 418,869, filed Dec. 16, 1964, in the names of Charles N. Kimberlin, Jr., and Harry E. Robson, and assigned to the assignee of this application.

The reaction gel or gel-oil mixture in then heated to a temperature of about 80° to 120° C., preferably 90 to 110° C., and then held at said temperature for a period of about 5 to 50 hours, preferably 16 to 36 hours, during which time synthetic crystalline sodium faujasite crystals are formed. The mixing is continued during the heat-up period but discontinued once the above temperature is reached so that the actual crystallization occurs when the reaction mixture is quiescent. During the crystallization step, the reaction gel reverts to the systalline sodium faujasite product in a sodium silicate liquor.

Once the point of maximum crystallinity and purity has been reached, as evidenced by analysis of a product sample, the crystallization step is terminated by discontinuing heating and by adding about 0.5 to 2 volumes of cold water to the crystallization mixture. If the above-described oil immersion technique is utilized, the oil is simply removed by decantation. The crystalline product material is then separated from the mother liquid by filtration and washed until the wash water has a pH of about 10 to 11 or less. If desired, the product may be dried and in order to obtain the anhydrous form which is used as an adsorbent, the product is calcined at elevated temperatures, e.g. 300° to 450° C.

The source or method of preparation of the sodium aluminate ingredient will often determine the degree of crystallinity and purity of the final synthetic faujasite product. As mentioned, the present process contemplates the use of low water content in the reaction mixture. If the sodium aluminate ingredient is supplied by conventional sodium aluminate powder, the minimum allowable water content is determined by its solubility. If insufficient water is used, the resulting liquor has been found to contain a precipitate which is more susceptible to forming undesirable extraneous crystalline phases, i.e. phases other than the desired synthetic faujasite phase. Thus, it has been found preferable in connection with the present process to use a super-saturated, metastable, sodium aluminate liquor which is free of precipicated sodium aluminate and which is prepared from concentrated caustic solution and alumina trihydrate (synthetic gibbsite, $Al_2O_3 \cdot 3H_2O$). In this preparation, caustic solution containing, for example, about 40 to 50 wt. percent NaOH, is first heated to a temperature of about 200° F. or above. Alumina trihydrate is thereafter added to the hot concentrated caustic in an amount sufficient to yield a sodium aluminate liquor containing 10 to 30, preferably 20 to 24, wt. percent $Al_2O_3$. The alumina trihydrate dissolves in a short period of time, e.g. 10 to 30 minutes, to yield a substantially clear solution and is then rapidly cooled to ambient temperature to avoid precipitation of crystalline sodium aluminate. The resulting solution, although metastable, can be readily handled and stored for 7 days or more without precipitating sodium aluminate; however, it will be preferable to prepare the sodium aluminate liquor within about 24 hours of its use in the synthetic faujasite preparation procedure. The reaction mixture gels which are prepared from this clear, concentrated liquor yield a superior synthetic faujasite product. Moreover, since there is less tendency to form extraneous phases other than the desired faujasite phase, the crystallization period can be continued for a longer time in order to produce a higher yield of desired synthetic faujasite product. Thus, where the source of sodium aluminate is a sodium aluminate liquor prepared by the above procedure, crystallization times at the aforementioned elevated crystallization temperature can be extended up to about 100 hours.

The source of silica is most preferably a colloidal silica sol which is used in concentrated form and contains about 30 to 50 wt. percent $SiO_2$, preferably about 35 to 42 wt. percent, e.g. 40 wt. percent $SiO_2$. The sol can be prepared by ion exchange according to the procedure described in U.S. Patent 2,244,325 and is then neutralized with excess alkali metal silicate, e.g. sodium silicate, to a pH of about 8 to 9.5, e.g. 8.5, and dewatered by evaporation. For the production of highly concentrated sols, e.g. up to about 42 wt. percent $SiO_2$, it has been found most preferable to conduct the concentration at temperatures above the normal boiling point of water, after adjusting the silica to soda ratio of the sol to within the range of 20:1 to 50:1, preferably 30:1 to 40:1, e.g. about 35:1. This particularly preferred procedure for producing very highly concentrated silica sols thus involves contacting a 1 to 5 wt. percent sodium silicate aqueous solution with an acid-treated cation exchange resin in the hydrogen form following the procedure of U.S. 2,244,325. The resulting effluent from the ion-exchanger is then stabilized by adding sufficient concentrated sodium silicate solution to produce an aqueous sol having a silica to soda ratio within the aforementioned ranges. The stabilized aqeuous sol is then concentrated to the desired value, preferably by evaporation under superatmospheric pressure at a temperature above the normal boiling point of water, from a well-agitated vessel. Typical pressures will be in the range of about 20 to 100, preferably 20 to 50 p.s.i.a., with resultant temperatures of 228 to 328, preferably 228 to 282° F. In the concentration step, it is important that the entire heating surface be completely immersed by the agitated sol, to avoid overconcentration which may initiate gelation. The imposition of a positive pressure during the evaporative concentration of the silica sol having the aforementioned silica to soda ratios has been found to enable the production of very highly concentrated and stable silica sols by relatively simple procedures. As a result of the positive pressure, concentrated sols are produced having higher $SiO_2$ contents and greater stability, i.e. resistance to gelation.

The heat exchange medium into which the reaction gel is preferably immersed prior to being heated to crystallization temperature, in the above-described preferred embodiment, may be any of the well-known conventional heat exchange fluids, provided only that it be immiscible with water, will not react with the reactants or the synthetic faujasite product, and have a flash point substantially above the crystallization temperature, preferably above about 250° F. Suitable heat exchange fluids are well known in the art and numerous examples may be mentioned. Among these are included the hydrocarbon oils, silicone fluids (e.g. "Dowtherm"), the polyethylene glycols, chlorinated hydrocarbon oils (e.g. "Convaclor–8" by Consolidated Vacuum Corp.), and esters such as butyl phthalate (e.g. "Octoil" by Consolidated Vacuum Corp.), etc.

To summarize, a particularly preferred procedure will comprise the combination of the reactant ingredients as previously described in amounts calculated to produce the aforementioned reactant ratios; introducing the resulting reaction mixture into a liquid medium which is substantially immiscible with water and unreactive with either the ingredients or the synthetic faujasite product and which has a flash point substantially above the crystallization temperature; cooling the mixture to below about 100° F., preferably below about 80° F.; heating the mixture to the crystallization temperature and holding at said temperature for a sufficient period to crystallize the faujasite product; thereafter separating the liquid medium from the faujasite product by decantation or the like; and finally washing the product free of the liquid medium with water. The use of the liquid heat transfer medium is conducive to shorter crystallization times because of the more efficient heat transfer realized.

The zeolite produced in accordance with the present invention can be used as an adsorbent. The zeolite can be activated in a known manner by heating to effect the loss of water of hydration. The loss of water gives rise to a crystalline structure having interlacing canals with molecular dimensions and offering very large contact surfaces for the adsorption of foreign molecules. These zeolites are very useful as adsorbents and are used to separate molecules having critical dimensions smaller than the pore size of the sieve from molecules having molecular dimensions larger than the pore sizes of the sieves. One of the properties of synthetic faujasite is its strong preference for polar and unsaturated molecules. These materials are strongly and preferentially adsorbed provided that the molecular dimension and shape of these materials permit their penetration into the pores of the structure. The zeolite produced in accordance with this invention can be used as an adsorbent in any appropriate form. Powdered crystalline material can be used as well as pelleted crystalline material. Another property of a synthetic faujasite having a high silica to alumina ratio, which makes it highly useful as a commercial adsorbent, is its exceptional stability at high temperatures in the presence of moisture. For example, a synthetic faujasite having a ratio of $SiO_2$ to $Al_2O_3$ of 4 to 6 is substantially more hydrolytically stable than one having a ratio of less than 4.

Various modifications in the advantages obtained by the present invention will be made more clearly apparent by reference to the following description and the accompanying examples.

*Example 1*

In 68 grams of distilled water there are dissolved 90 grams of sodium aluminate containing 38% by weight of $Na_2O$, 38% by weight of $Al_2O_3$, 24% of $H_2O$, and 20 grams of sodium hydroxide containing 75% by weight of $Na_2O$. This solution is added to 466 grams of an aqueous sol of colloidal silica containing 30% by weight of $SiO_2$. The resultant mixture is stirred until it is homogeneous and has a molar composition as follows:

$$2.4Na_2O : Al_2O_3 : 7SiO_2 : 70H_2O$$

The reaction vessel is then sealed and heated to a temperature of 90–110° C. for a crystallization period of about 24–30 hours. The solid crystalline product formed is separated from the mother liquor by filtration and washed until it has a pH of about 10–11 and dried at a temperature of 400° C. By conventional X-ray diffraction techniques and product analysis, product is identified as being 100% faujasite.

portions of an extraneous crystalline phase, which was identified as synthetic gmelinite. This type of zeolite is described in U.S. Patent No. 3,054,657. The proportion of this extraneous phase in each run is indicated in the last column of Table IV.

TABLE IV

| Run | $Al_2O_3$ | $Na_2O$ | $SiO_2$ | $H_2O$ | Time (hrs.) | Crystallinity | $SiO_2$ Utilization | Percent Extraneous Synthetic Gmelinite Phase |
|---|---|---|---|---|---|---|---|---|
| 3 | 1 | 2.4 | 7 | 70 | 16 | 135 | 79 | None |
| 4 | 1 | 2.4 | 7 | 70 | 24 | 151 | 77 | Trace |
| 5 | 1 | 2.4 | 7 | 70 | 48 | 116 | 79 | 5 |
| 6 | 1 | 2.4 | 7 | 70 | 72 | 66 | 78 | 30 |
| 7 | 1 | 2.4 | 7 | 70 | 96 | 4 | 78 | 50 |

*Example 2*

The data presented below in Tables III–IV were obtained by carrying out the process similar to that in Example 1 and merely varying the ratios of the reactants present. A specific example of the procedure used is as follows: sodium alumina powder (37.9% $Al_2O_3$, 38.2% $Na_2O$ by weight) and sodium hydroxide (97% sodium hydroxide) were dissolved in water and the solution added to silica sol (30% $SiO_2$). The mixture was mixed until homogeneous. With a particular reaction mix, the mixture is separated into several equal parts and heated at about 100° C. and at various periods of crystallization time a particular sample is removed and analyzed to determine the crystallinity of the product and utilization of $SiO_2$. The samples were removed after the indicated time period, filtered and washed to a pH of about 10.5. The product was dried at 130° C. and contained some water of hydration. The products were analyzed and were identified as synthetic faujasite by comparison to the standard sample as previously described. The product quality as compared to the standard sample is indicated by the crystallinity. The crystallinity of the synthetic faujasite phase was calculated by adding intensities of the 10 strongest X-ray lines and dividing by the constant 1.72 and comparing them to the laboratory standard sample. $SiO_2$ utilization was calculated from the weight percent oven dried product (assumed to be 8% $H_2O$) on original slurries assuming 100% incorporation of $Al_2O_3$ from slurry into product and $Na_2O/Al_2O_3$ equal to 1.0 in the product.

As previously stated, the above process was carried out varying the ratios of particular reactants and crystallization treatments as indicated in Tables III and IV below with the effects on crystallinity, $SiO_2$ utilization, and crystallization times indicated.

Table IV shows the effect of crystallization time on crystallinity and $SiO_2$ utilization at constant water content, $SiO_2/Al_2O_3$ ratio and soda content. It is obvious from the above data that carrying out the crystallization for prolonged periods of time, e.g. above 50 hours, detrimentally affects product crystallinity, i.e. quality, when the faujasite is prepared from the above source materials. The crystallization period is thus characterized by the gradual appearance of the undesired extraneous synthetic gmelinite phase with a corresponding disappearance of the desired synthetic faujasite phase. At very long crystallization times (e.g. 96 hours) the synthetic faujasite phase is seen to be practically non-existent.

*Example 3*

This example demonstrates the advantage to be gained from utilizing a sodium aluminate starting material which is prepared by the procedure hereinbefore described.

A concentrated, metastable, sodium aluminate liquor which was free of precipitated sodium aluminate was prepared from a concentrated caustic solution and alumina trihydrate, i.e. synthetic gibbsite ($Al_2O_3 \cdot 3H_2O$). 157 grams of alumina trihydrate powder was added to 328 grams of caustic solution containing about 43 wt. percent NaOH which had been previously heated to 200° F. After about 30 minutes the alumina dissolved and the resulting clear solution was then cooled to ambient temperature (about 75° F.). The aqueous solution contained 25 wt. percent $Al_2O_3$ and showed no precipitate after at least about 2 hours at which point it was utilized in the preparation of synthetic faujasite by the preparation procedure of Examples 1 and 2. The crystallinity of the zeolite product during

TABLE III

| Run | $Al_2O_3$ | $Na_2O$ | $SiO_2$ | $H_2O$ | Time* (hrs.) | Crystallinity | $SiO_2$ Utilization |
|---|---|---|---|---|---|---|---|
| 1 | 1 | 2.4 | 6 | 60 | 24 | 99 | 78 |
| 2 | 1 | 2.4 | 7 | 70 | 24 | 151 | 77 |

*Crystallization time at 100° C. which produced maximum crystallinity.

Table III shows that highly crystalline product can be obtained at short crystallization periods and with high utilization of $SiO_2$ from the reaction mixtures with applicant's claimed ranges.

The products formed by the preparations summarized in Table IV were found by analysis to contain varying proportions the crystallization period was periodically measured by analysis of a sample withdrawn from the crystallization mixture.

The above preparation of synthetic faujasite was repeated identically except that sodium aluminate powder was used in place of the sodium aluminate liquor.

The results of these two preparations are shown in the following table, which demonstrates the unexpected dependency of product crystallinity on alumina source.

TABLE V

|  | Preparation | |
| --- | --- | --- |
|  | A | B |
| Al$_2$O$_3$ Source | NaAlO$_2$ powder | Al$_2$O$_3$.3H$_2$O |
| Reactant ratios: | | |
| SiO$_2$/Al$_2$O$_3$ | 7.0 | 7.0 |
| Na$_2$O/Al$_2$O$_3$ | 2.4 | 2.2 |
| H$_2$O/Na$_2$O | 29 | 32 |
| Product Crystallinity After— | | |
| 1 day at 210° F | 151 | 5 |
| 2 days at 210° F | 116 | 144 |
| 3 days at 210° F | 66 | 178 |
| 4 days at 210° F | 4 | 176 |

As shown in the above table, Run B, which used the sodium aluminate liquor prepared from aluminate trihydrate and sodium hydroxide, produced a superior crystalline product in the latter stages of crystallization. It may be observed that in Preparation A, which used sodium aluminate powder as the alumina source, the product crystallinity degraded steadily due to the disappearance of the synthetic faujasite phase, and the appearance of undesired extraneous crystalline phases, and amorphous material. For this reason, when sodium aluminate powder is used as the alumina source, the crystallization period should not be continued much past about 2 days. However, when the specially prepared sodium aluminate liquor was used as the alumina source in Preparation B, the product crystallinity increased steadily up to about 3 days and then leveled off at an essentially constant value. The appearance of undesired extraneous crystalline or amorphous phases is not apparent, therefore, when this specially prepared alumina source material is used. As a result, the crystallization period in Preparation B can be continued for a longer period of time to thereby produce a higher yield of a superior synthetic faujasite product.

*Example 4*

To further demonstrate the process of the present invention, the following series of runs was performed following the procedure of Examples 1 and 2. The alumina source was a sodium aluminate liquor as prepared in Example 3. The silica source was a 40% silica sol. ("Ludox HS-40," supplied by E. I. duPont de Nemours & Co.)

TABLE VI

| Run | Al$_2$O$_3$ | Na$_2$O | SiO$_2$ | H$_2$O | Crystallization Time, hrs. | Crystallinity |
| --- | --- | --- | --- | --- | --- | --- |
| 8 | 1 | 2.0 | 5.0 | 39 | 24 | 172 |
| 9 | 1 | 2.0 | 6.7 | 48 | 8 | 156 |
| 10 | 1 | 2.1 | 7.0 | 49 | 48 | 203 |
| 11 | 1 | 2.0 | 7.0 | 49 | 48 | 179 |

*Example 5*

To further illustrate the process of the present invention, the following synthetic faujasite preparation was performed using a 30% silica sol prepared by ion exchange according to the procedure of U.S. Patent No. 2,244,325, and evaporation of sufficient water from the ion-exchanged effluent to produce a 30% sol. 582 grams of this sol was combined with a sodium aluminate liquor prepared from 63 grams of alumina trihydrate, 65 grams of sodium hydroxide, and 60 grams of water by the procedure of Example 3. The resulting gel had an overall composition of 2.2Na$_2$O:Al$_2$O$_3$:7SiO$_2$:70H$_2$O. Crystallization was performed at 210° F. for 48 hours. The product had a crystallinity of 216% and was substantially free of extraneous phases.

*Example 6*

This example demonstrates the desirability of cooling the reaction mixture after combining the ingredients prior to heatup to crystallization temperature.

A sodium aluminate liquor prepared from alumina trihydrate and 50% caustic solution as described in Example 3 was combined with 40% silica sol ("Ludox HS-40") in a centrifugal pump. The gel product issuing from the pump was at a temperature of about 140° F., and had the following composition:

$$2.1Na_2O:Al_2O_3:7SiO_2:49H_2O$$

One portion of this gel was cooled to 75° F. by immediate immersion in chilled oil. A second identical portion was immersed in similar oil preheated to 140° F. After 4 hours aging at these respective temperatures, both samples where heated to 210° F. for two days to crystallize the product. The first portion, which had been cooled to 75° F., gave an excellent faujasite product having a crystallinity of 180. The second portion, which had been aged at 140° F., gave a poor faujasite product having a crystallinity of less than 50, which was contaminated by amorphous material and extraneous crystalline phases.

*Example 7*

This example demonstrates the advantage of cooling the reaction mixture to within a few degrees of but not below its freezing point prior to the heat-up to crystallization temperature. In this preparation, 526 grams of 40% silica sol were combined with a sodium aluminate liquor prepared from 83.5 grams of alumina trihydrate, 71.9 grams of sodium hydroxide and 82.8 grams of water by the procedure of Example 3. The resulting gel was divided into 3 portions and cooled to different temperatures prior to being heated to the usual crystallization temperature. The usual 2-day crystallization period was employed. The results are shown in Table VI.

TABLE VI

| Sample | Minimum Temperature Prior to Heat-up, ° F. | Product Crystallinity |
| --- | --- | --- |
| X | 75 | 164 |
| Y | 35 | 209 |
| Z | 0 | 155 |

Highest crystallinity is thus produced by cooling the reaction mixture to near the freezing point. Temperatures below the freezing point should be avoided, as evidenced by Sample Z.

*Example 8*

A synthetic faujasite having a silica to alumina mole ratio of 4.8 is prepared from a reaction mixture having the following composition:

| Component | Moles | Weight percent |
|---|---|---|
| $Al_2O_3$ | 1.0 | 6.7 |
| $SiO_2$ | 7.0 | 27.4 |
| $Na_2O$ | 2.1 | 8.5 |
| $H_2O$ | 48.8 | 57.4 |

The source of alumina and soda is a sodium aluminate liquor prepared by the procedure of Example 3, containing 21.3 wt. percent $Al_2O_3$. The source of silica (and partial source of soda) is a 40% colloidal silica sol prepared by ion exchange according to U.S. 2,244,325 which is neutralized with excess sodium silicate to a pH of about 8 and then dewatered at about 250° F. and 30 p.s.i.a. The sodium aluminate liquor is added to the silica sol, with mixing, in proportions calculated to produce the above composition. Upon mixing, gelation occurs almost instantaneously. The resulting gel is immediately cooled to below about 80° F. by suitable cooling means. The mixed gel is discharged into an agitated vessel containing a hydrocarbon oil having a flash point above about 250° F. (e.g. "Mentor 28" oil, available from Humble Oil & Refining Co.). The addition of the mixed gel to the agitated oil is also performed below about 80° F. The resulting suspension of reaction gel in oil is sufficiently fluid for efficient heat transfer. It will be convenient to employ a continuous mixing operation for combining the sodium aluminate and silica sol streams using a mechanical mixing device such as a pump or two-fluid nozzle or line mixer and to thereby immediately discharge the combined mixture directly into the hydrocarbon oil.

The mixture of reaction gel in oil is then heated to the crystallization temperature of about 210° F., with continued mixing. When this temperature is reached, the mixing is discontinued and the mixture is held at this temperature until crystallization is complete, which takes about 36 hours. The termination point is determined by analysis of a sample taken from the crystallization mixture.

When crystallization is complete, the reaction is terminated by adding about 1 volume of cold water (60° F.) per volume of reaction mixture plus oil. The oil phase is removed by decantation, and the water phase containing the crystalline product is separated from the residual mother liquor and included oil by filtration. The crystalline product cake is then washed with water to remove residual quantities of oil and until the wash water has a pH of 11 or less. The product may then be dried at a temperature of about 120° C. if desired. Additionally, it may be calcined at about 300–450° C. in order to activate it for use as an adsorbent.

Applicant's invention is in finding an improved processs for making large pore synthetic crystalline sodium alumino silicate faujasites, which can be particularly useful as adsorbents. The invention is not intended to be restricted to the examples, but rather to the scope of the appended claims.

What is claimed is:
1. An improved process for preparing crystalline synthetic faujasite having the following molar ratios of constituents:

$$1.0 \pm 0.2 Na_2O : Al_2O_3 : nSiO_2$$

wherein $n$ has a value above 3, which comprises:
(1) combining (a) aqueous colloidal silica sol containing about 30 to 50 wt. percent silica, and (b) aqueous sodium aluminate liquor, the ratios and compositions of said sodium aluminate liquor and said silica sol being adjusted to produce a reaction mixture having the following molar ratios of constituents:

| | |
|---|---|
| $SiO_2/Al_2O_3$ | 5 to 7.5 |
| $Na_2O/SiO_2$ | .30 to .40 |
| $H_2O/Na_2O$ | 20 to 30 |

(2) maintaining the temperature of said reaction mixture during step (1) below about 38° C.;
(3) heating said reaction mixture to a temperature within the range of about 80° to 120° C.;
(4) aging said reaction mixture at a temperature within the range of about 80° to 120° C. for a period of about 16 to 36 hours to thereby crystallize said faujasite; and
(5) recovering the crystallized product.

2. The process of claim 1, wherein said molar ratios of constituents are within the following ranges:

| | |
|---|---|
| $SiO_2/Al_2O_3$ | 6 to 7 |
| $Na_2O/SiO_2$ | .30 to .35 |
| $H_2O/Na_2O$ | 20 to 25 |

3. The process of claim 1, wherein said molar ratios of constituents in the reaction mixture are as follows:

| | |
|---|---|
| $SiO_2/Al_2O_3$ | about 7.0 |
| $Na_2O/SiO_2$ | about 0.30 |
| $H_2O/Na_2O$ | about 23 |

4. The process of claim 1, wherein said temperature range in said steps (3) and (4) is about 90° to 110° C.
5. The process of claim 1, wherein said temperature in step (2) is below about 27° C.
6. The process of claim 1, wherein said temperature in step (2) is maintained within a few degrees of, but not below, the freezing point of said reaction mixture.
7. The process of claim 4, wherein $n$ has a value of 4 to 6.
8. The process of claim 2, wherein $n$ has a value of 4 to 6 and wherein said temperature range in steps (3) and (4) is about 90° to 110° C.

References Cited
UNITED STATES PATENTS

| | | | |
|---|---|---|---|
| 2,882,244 | 4/1959 | Milton | 252—445 |
| 2,979,381 | 4/1961 | Gottstine et al. | 23—113 |
| 3,008,803 | 11/1961 | Milton | 23—113 |
| 3,054,657 | 9/1962 | Breck | 23—113 |
| 3,130,007 | 4/1964 | Breck | 23—113 |

OSCAR R. VERTIZ, *Primary Examiner.*

MILTON WEISSMAN, *Examiner.*

E. J. MEROS, *Assistant Examiner.*